United States Patent Office 3,068,226
Patented Dec. 11, 1962

3,068,226
PROCESS FOR THE PREPARATION OF 16-METH-YLENE COMPOUNDS OF THE PREGNANE SERIES
David Taub, Metuchen, Norman L. Wendler, Summit, and Robert D. Hoffsommer, Jr., Metuchen, N.J., assignors to Merck & Co., Inc., Rahway, N.J., a corporation of New Jersey
No Drawing. Filed Dec. 22, 1961, Ser. No. 161,396
16 Claims. (Cl. 260—239.55)

This invention relates to an improved process for the preparation of 16-alkylene steroids of the pregnane series as well as the 16-lower alkyl-16,17-oxido intermediates thereof. More particularly, this invention relates to a novel two-step process for the conversion of 16-lower alkyl-$\Delta^{16}$-steroids of the pregnane series to the corresponding 16-alkylene compounds whereby both the 16-alkylene end product and 16-lower alkyl 16,17-oxido intermediate are formed in high yield.

This application is a continuation-in-part of copending applications Serial No. 801,429, filed March 24, 1959, and Serial No. 818,017, filed June 4, 1959.

The 16-alkylene steroids produced in accordance with the present invention possess extermely high anti-inflammatory activity and are especially effective for the treatment of arthritis and related diseases since they can be administered for their cortisone-like action in low dosage thereby minimizing undesired side effects.

One method which has been employed to convert 16-lower alkyl-$\Delta^{16}$-steroids to the corresponding 16-alkylene compounds has been to react the 16-lower alkyl-$\Delta^{16}$-steroid starting material with an alkaline solution of hydrogen peroxide or with an alkyl hydroperoxide in the presence of a strong base, as for example, hydrogen peroxide in the presence of sodium hydroxide, to obtain the corresponding 16-lower alkyl-16,17-oxido compound, which, upon contact with a hydrohalic acid such as hydrochloric acid, results in the formation of the 16-alkylene steroid compound.

The primary disadvantages of having to use a strong base in the first step of this process are (1) the resulting alkaline hydrolysis of any 21-ester groups present as well as (2) the danger of cleavage of the whole 17-side chain with the resulting loss of yield. In the second step of this process, the use of hydrohalic acids is likewise undesirable because of the formation of many unwanted yet closely-related steroid by-products from which it is difficult to separate the desired 16-alkylene product without using elaborate chromatographic procedures. Thus, for example, the reaction of 9$\alpha$-fluoro-11$\beta$,21-dihydroxy-16$\beta$-methyl-16$\alpha$,17$\alpha$-oxido-1,4-pregnadiene-3,20-dione 21 - acetate with hydrogen chloride results in the production of a mixture of (1) 9$\alpha$-fluoro-11$\beta$,17$\alpha$,21-trihydroxy-16-methylene-1,4-pregnadiene-3,20-dione 21-acetate, (2) 9$\alpha$-fluoro-11$\beta$,17$\alpha$,21-trihydroxy-16-methyl - 1,4,15 - pregnatriene-3,20-dione 21-acetate, (3) 9$\alpha$-fluoro-11$\beta$,21-dihydroxy-16-methyl-1,4,14,16-pregnatetraene-3,20-dione 21-acetate, and (4) 9$\alpha$ - fluoro-15-chloro - 11$\beta$,21-dihydroxy - 16 - methyl-1,4,16-pregnatriene-3,20-dione 21-acetate. In view of these difficulties, it was desirable to find a process which would minimize the formation of by-products and thus enhance the yield of the desired 16-alkylene steroid product.

It has now been found in accordance with the present invention that 16-lower alkyl-$\Delta^{16}$-steroids of the pregnane series may be converted to the corresponding 16-alkylene steroid compounds by reacting the 16-lower alkyl-$\Delta^{16}$-steroid starting material with an organic peracid of a strong carboxylic acid in the presence of an alkaline buffering agent, and contacting the resulting 16-methyl-16,17-oxido compound with a strong carboxylic acid to obtain the 16-alkylene steroid in high yield.

As starting materials in the present process, there are employed 16-lower alkyl-$\Delta^{16}$-steroids represented by the partial formula:

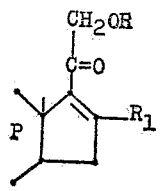

wherein $R_1$ is lower alkyl and P represents an unsaturated pregnane ring nucleus having an oxygen substituent, such as keto or hydroxyl at C–11, hydrogen or halogen at C–9, a keto group at C–3 and unsaturation in the A ring at C–4 or C–1 and C–4. The R group may be hydrogen but it is preferably an ester group derived from an organic carboxylic acid, especially such acids as formic, acetic, propionic, benzoic and the like. Typical examples of suitable 16-lower alkyl-$\Delta^{16}$-steroid starting materials are:

16-methyl-21-hydroxy-4,16-pregnadiene-3,11,20-trione 21-acetate,
16-methyl-11$\beta$,21-dihydroxy-4,16-pregnadiene-3,20-dione 21-acetate,
9$\alpha$-fluoro-16-methyl-21-hydroxy-4,16-pregnadiene-3,11,20-trione 21-acetate,
9$\alpha$-fluoro-16-methyl-11$\beta$,21-dihydroxy-4,16-pregnadiene-3,20-dione 21-acetate,
16-methyl-21-hydroxy-1,4,16-pregnatriene-3,11,20-trione 21-acetate,
16-methyl-11$\beta$,21-dihydroxy-1,4,16-pregnatriene-3,20-dione 21-acetate,
9$\alpha$-fluoro-16-methyl-21-hydroxy-1,4,16-pregnatriene-3,11,20-trione 21-acetate,
9$\alpha$-fluoro-16-methyl-11$\beta$,21-dihydroxy-1,4,16-pregnatriene-3,20-dione 21-acetate, and the like.

In the first step of the present process, the 16-lower alkyl-16,17-oxido compounds are prepared by reacting the 16-lower alkyl-$\Delta^{16}$-starting material with an organic peracid of a strong carboxylic acid. Thus, peracids of formic acid, trichloroacetic acid, difluoroacetic acid and the like may satisfactorily be employed in this process, although peroxytrifluoroacetic acid has been found to be particularly effective in the conversion of the $\Delta^{16}$-steroid to the corresponding 16$\alpha$,17$\alpha$-oxido compound. When peroxytrifluoroacetic acid is employed, the reaction is conveniently carried out by dissolving the 16-lower alkyl-$\Delta^{16}$-steroid in an inert organic solvent such as benzene, toluene or the like and preferably methylene chloride, adding a basic alkaline buffering agent, as for example, disodium hydrogen phosphate or sodium bicarbonate and adding to this mixture peroxytrifluoroacetic acid in a compatible organic solvent, for example, methylene chloride. The reaction mixture is desirably stirred at a temperature of about 0° C. for a period of about 10–30 minutes and thereafter for about 1–2 hours at room temperature. The resulting 16-lower alkyl-16,17-oxido compound is then conveniently recovered by adding water to the mixture, extracting the solution with methylene chloride and drying the extract. Crystallization of the residue from a suitable solvent such as acetone, ethyl acetate or acetone-ether mixtures yields the 16-lower alkyl-16,17-oxido steroid.

In carrying out this step of the process, it has been found desirable to employ about 1 mole of peracid for each mole of starting material in order to avoid reaction of the peroxytrifluoroacetic acid with any other double bonds than the 16:17 double bond which may be present in the steroid nucleus.

The peroxytrifluoroacetic acid reagent is conveniently prepared by adding trifluoroacetic anhydride to a stirred solution of 90% hydrogen peroxide dissolved in methylene chloride. A fresh mixture of this reagent is then reacted with the steroid starting material.

In the second step of this process, the 16-lower alkyl-16,17-oxido steroid is reacted with a strong carboxylic acid such as formic, chloroacetic, trichloroacetic, halogenated propionic acid, oxalic acid and the like to form the corresponding 16-methylene steroid. It has been found that trifluoroacetic acid is particularly effective in carrying out this reaction. Thus, the 16-lower alkyl-16,17-oxido compound is conveniently reacted with trifluoroacetic acid at room temperature for a period of about 1–3 hours. In general, while no additional solvent is necessary, it has been found that by carrying out this process in the presence of benzene, a purer product free of any 14,16-diene by-product is obtained. The 16-alkylene-17-hydroxy steroid product is conveniently recovered by chromatography over neutral alumina and elution with benzene-chloroform mixtures. Alternatively, the reaction mixture may be extracted with methylene chloride, dried, and the residue crystallized from acetone, ether or acetone-ether mixtures.

In addition to the foregoing two-step process for the production of 16-alkylene steroids, this invention also contemplates the conversion of the 16-lower alkyl-$\Delta^{16}$-steroids to the corresponding 16-alkylene compound in a single step, thus eliminating the formation and isolation of the intermediate 16,17-oxido compound. This is accomplished by reacting the 16-lower alkyl-$\Delta^{16}$-steroid dissolved in an inert organic solvent such as methylene chloride with a mixture of a percarboxylic acid and a carboxylic acid, as for example, a mixture of peroxytrifluoroacetic acid and trifluoroacetic acid, in the absence of any basic buffering agent. The reaction is conveniently carried out by stirring the reaction mixture at 0° C. for about 10–30 minutes followed by further stirring at room temperature for 1–2 hours. After extracting the reaction mixture with methylene chloride and drying, the 16-alkylene-17-hydroxy steroid is readily recovered by chromatography or crystallization.

The following examples illustrate methods of carrying out the present invention, but it is to be understood that these examples are given for purposes of illustration and not of limitation.

*Example 1*

To a stirred mixture of 2.00 g. of 16-methyl-21-hydroxy-4,16-pregnadiene-3,11,20-trione 21-acetate and 30 g. of disodium hydrogen phosphate in 60 ml. of methylene chloride at 0° C. is added 10 ml. of 2.0 M peroxytrifluoroacetic acid reagent (prepared by cautiously adding 5.1 ml. of trifluoroacetic anhydride to a stirred solution of 0.82 ml. 90% hydrogen peroxide in 5 ml. of methylene chloride). After 10 minutes at 0° C. and 1 hour at 25° C., water is added and the mixture extracted with methylene chloride. The organic extract is washed with aqueous potassium bicarbonate, saturated sodium chloride and dried over magnesium sulfate. Crystallization of the residue from acetone-ether gives 16β-methyl-16α,17α-oxido-21-hydroxy-4-pregnene-3,11,20-trione 21-acetate.

In accordance with the foregoing procedure, but starting with 16-methyl-11β,21-dihydroxy-4,16-pregnadiene-3,20-dione 21-acetate there is obtained 16β-methyl-16α,17α - oxido - 11β,21-dihydroxy-4-pregnene-3,20-dione 21-acetate.

*Example 2*

To a stirred mixture of 2.00 g. of 9α-fluoro-16-methyl-21-hydroxy-4,16-pregnadiene-3,11,20-trione 21-acetate and 30 g. of sodium bicarbonate in 60 ml. of methylene chloride at 0° C. is added 10 ml. of 2.0 M performic acid. After 10 minutes at 0° C. and 1 hour at 25° C., water is added and the mixture extracted with methylene chloride. The organic extract is washed with aqueous potassium bicarbonate, saturated sodium chloride and dried over magnesium sulfate. Crystallization of the residue from acetone-ether gives 9α-fluoro-16β-methyl-16α,17α-oxido-21-hydroxy-4-pregnene-3,11,20-trione 21-acetate.

In accordance with the foregoing procedure, but starting with 9α - fluoro - 16 - methyl-11β,21-dihydroxy-4,16-pregnadiene-3,20-dione 21-acetate there is obtained 9α-fluoro - 16β - methyl - 16α,17α-oxido-11β,21-dihydroxy-4-pregnene-3,20-dione 21-acetate.

*Example 3*

To a stirred mixture of 2.00 g. of 16-methyl-21-hydroxy-1,4,16-pregnatriene-3,11,20-trione 21-acetate and 30 g. of disodium hydrogen phosphate in 60 ml. of benzene at 0° C. is added 10 ml. of 2.0 M peroxytrifluoroacetic acid reagent. After 10 minutes at 0° C. and 1 hour at 25° C., water is added and the mixture extracted with benzene. The organic extract is washed with aqueous potassium bicarbonate, saturated sodium chloride and dried over magnesium sulfate. Crystallization of the residue from acetone-ether gives 16β-methyl-16α,17α-oxido-21-hydroxy-1,4-pregnadiene-3,11,20-trione 21-acetate.

In accordance with the foregoing procedure, but starting with 16-methyl-11β,21-dihydroxy-1,4,16-pregnatriene-3,20-dione 21-acetate there is obtained 16β-methyl-16α,17α - oxido - 11β,21-dihydroxy-1,4-pregnadiene-3,20-dione 21-acetate.

*Example 4*

To a stirred mixture of 2.00 g. of 9α-fluoro-16-methyl-11β,21-dihydroxy-1,4,16-pregnatriene-3,20-dione 21-acetate and 15 g. of disodium hydrogen phosphate in 40 ml. of methylene chloride at 0° C. is added 5.0 ml. of 2.0 M peroxytrifluoroacetic acid (prepared by adding 5.1 ml. of trifluoroacetic anhydride to a stirred solution of 0.82 ml. 90% hydrogen peroxide in 5 ml. of methylene chloride). After 1 hour at 0° C., water is added and the mixture extracted with methylene chloride. The organic extract is washed with water and saturated salt solution and dried over magnesium sulfate. Crystallization of the residue from acetone-ether gives 9α-fluoro-16β-methyl-16α,17α-oxido - 11β,21 - dihydroxy-1,4-pregnadiene-3,20-dione 21-acetate.

In accordance with the foregoing procedure, but starting with 9α-fluoro-16-methyl-21-hydroxy-1,4,16-pregnatriene-3,11,20-trione 21-acetate there is obtained 9α-fluoro - 16β-methyl-16α,17α-oxido-21-hydroxy-1,4-pregnadiene-3,11,20-trione 21-acetate.

*Example 5*

To 240 mg. of 16β-methyl-16α,17α-oxido-21-hyroxy-4-pregnene-3,11,20-trione 21-acetate is added 3 ml. of trifluoroacetic acid mixed with 2 ml. of benzene. After 2 hours at 25° C., water is added and the mixture is extracted with methylene chloride. The organic extract is washed with aqueous potassium bicarbonate, saturated sodium chloride and dried over magnesium sulfate. Crystallization of the residue from acetone-ether gives 16 - methylene - 17α,21-dihydroxy-4-pregnene-3,11,20-trione 21-acetate.

In accordance with the foregoing procedure, but starting with 16β-methyl-16α,17α-oxido-11β,21-dihydroxy-4-pregnene-3,20-dione 21-acetate there is obtained 16-methylene - 11β,17α,21-trihydroxy-4-pregnene-3,20-dione 21-acetate.

*Example 6*

To 240 mg. of 9α-fluoro-16β-methyl-16α,17α-oxido-21-hydroxy-4-pregnene-3,11,20-trione 21-acetate is added 3 ml. of trichloroacetic acid. After 2 hours at 25° C., water is added and the mixture is extracted with methylene chloride. The organic extract is washed with aqueous potassium bicarbonate, saturated sodium chloride and dried over magnesium sulfate. Crystallization of the residue from acetone-ether gives 9α-fluoro-16-methylene-17α,21-dihydroxy-4-pregnene-3,11,20-trione 21-acetate.

In accordance with the foregoing procedure, but starting with 9α-fluoro-16β-methyl-16α,17α-oxido-11β,21-dihydroxy-4-pregnene-3,20-dione 21-acetate there is obtained 9α - fluoro - 16-methylene-11β,17α,21-trihydroxy-4-pregnene-3,20-dione 21-acetate

*Example 7*

To 240 mg. of 16β-methyl-16α,17α-oxido-21-hydroxy-1,4-pregnadiene-3,11,20-trione 21-acetate is added 3 ml. of oxalic acid. After 2 hours at 25° C., water is added and the mixture is extracted with methylene chloride. The organic extract is washed with aqueous potassium bicarbonate, saturated sodium chloride and dried over magnesium sulfate. Crystallization of the residue from acetone-ether gives 16-methylene-17α,21-dihydroxy-1,4-pregnadiene-3,11,20-trione 21-acetate.

In accordance with the foregoing procedure, but starting with 16β-methyl-16α,17α-oxido-11β,21-dihydroxy-1,4-pregnadiene-3,20-dione 21-acetate there is obtained 16-methylene - 11β,17α,21 - trihydroxy - 1,4 - pregnadiene-3,20-dione 21-acetate.

*Example 8*

To a stirred solution of 1.00 g. of 9α-fluoro-16β-methyl-16α, 17α-oxido-11β,21-dihydroxy-1,4-pregnadiene-3,20-dione 21-acetate in 20 ml. of benzene at 10° C. is added a mixture of 4 ml. of trifluoroacetic acid and 10 ml. of benzene. After 18 hours at 20–25° C. cold 5% sodium carbonate is added and the mixture extracted with ethyl acetate. The organic layer is washed with saturated sodium chloride solution, dried over magnesium sulfate and concentrated to dryness. Crystallization of the solid residue from ethyl acetate gives 9α-fluoro-16-methylene-11β,17α,21-trihydroxy-1,4-pregnadiene-3,20-dione 21-acetate.

*Example 9*

To a stirred mixture of 2.00 g. of 9α-fluoro-16-methyl-11β,21 - dihydroxy-4,16-pregnadiene-3,20-dione 21-acetate in 60. ml. of methylene chloride at 0° C. is added 10 ml. of a mixture of peroxytrifluoroacetic acid reagent and trifluoroacetic acid in a ratio of 1:1. After 10 minutes at 0° C. and 1 hour at 25° C., water is added and the mixture extracted with methylene chloride. The organic extract is washed with aqueous potassium bicarbonate, saturated sodium chloride and dried over magnesium sulfate. Crystallization of the residue from acetone-ether gives 9α-fluoro - 16-methylene-11β,17α,21-trihydroxy-4,16-pregnadiene-3,20-dione 21-acetate.

In accordance with the foregoing procedure, but starting with 9α - fluoro-16-methyl-11β,21-dihydroxy-1,4,16-pregnatriene-3,20-dione 21-acetate there is obtained 9α-fluoro - 16 - methylene-11β,17α,21-trihydroxy-1,4,16-pregnatriene-3,20-dione 21-acetate.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a 16-lower alkyl-Δ¹⁶-steroid of the pregnane series with a strong percarboxylic acid in the presence of an alkaline buffering agent, thereby forming the corresponding 16β-lower alkyl-16α,17α-oxido steroid compound, and reacting this compound with a strong carboxylic acid to obtain the corresponding 16-lower alkylene-17-hydroxy steroid of the pregnane series.

2. The process which comprises reacting 16-methyl-11β,21-dihydroxy-4,16-pregnadiene-3,20-dione 21-acetate with peroxy trifluoroacetic acid in the presence of disodium hydrogen phosphate, thereby forming the corresponding 16β-methyl-16α,17α-oxido-steroid compound and reacting this compound with trifluoroacetic acid to obtain 16 - methylene-11β,17α,21-trihydroxy-4-pregnene-3,20-dione 21-acetate 3. The process which comprises reacting 9α-fluoro-16-methyl-11β,21-dihydroxy-4,16-pregnadiene-3,20-dione 21-acetate with peroxytrifluoroacetic acid in the presence of disodium hydrogen phosphate, thereby forming the corresponding 16β-methyl-16α,17α-oxido-steroid compound and reacting this compound with trifluoroacetic acid to obtain 9α - fluoro-16-methylene-11β,17α,21-trihydroxy-4-pregnene-3,20-dione 21-acetate.

4. The process which comprises reacting 16-methyl-11β,21 - dihydroxy-1,4,16-pregnatriene-3,20-dione 21-acetate with peroxytrifluoroacetic acid in the presence of disodium hydrogen phosphate, thereby forming the corresponding 16β-methyl-16α,17α-oxido-steroid compound and reacting this compound with trifluoroacetic acid to obtain 16 - methylene - 11β,17α,21-trihydroxy-1,4-pregnadiene-3,20-dione 21-acetate.

5. The process which comprises reacting 9α-fluoro-16-methyl - 11β,21-dihydroxy-1,4,16-pregnatriene-3,20-dione 21-acetate with peroxytrifluoroacetic acid in the presence of disodium hydrogen phosphate, thereby forming the corresponding 16β - methyl - 16α,17α-oxido-steroid compound and reacting this compound with trifluoroacetic acid to obtain 9α-fluoro-16-methylene-11β,17α,21-trihydroxy-1,4-pregnadiene-3,20-dione 21-acetate.

6. The process which comprises reacting a 16-lower alkyl-11,21-bisoxygenated-Δ¹⁶-steroid of the pregnane series with a strong percarboxylic acid in the presence of an alkaline buffering agent to form the corresponding 16β-lower alkyl-11,21-bisoxygenated-16α,17α-oxido-steroid compound.

7. The process according to claim 6, wherein the percarboxylic acid is peroxytrifluoroacetic acid and the buffering agent is disodium hydrogen phosphate.

8. The process according to claim 6 wherein the percarboxylic acid is performic acid and the buffering agent is sodium carbonate.

9. The process according to claim 6 wherein the percarboxylic acid in peroxydifluoroacetic acid and the buffering agent is disodium hydrogen phosphate.

10. The process which comprises reacting a 16β-lower alkyl-11,21-bisoxygenated-16α,17α-oxido-steroid of the pregnane series with a strong carboxylic acid to obtain the corresponding 16-lower alkylene-17α-hydroxy-steroid compound.

11. The process according to claim 10 wherein the reaction is carried out in the presence of the organic solvent benzene.

12. The process according to claim 10 wherein the carboxylic acid is trifluoroacetic acid.

13. The process according to claim 10 wherein the carboxylic acid is trichloroacetic acid.

14. The process according to claim 10 wherein the carboxylic acid is oxalic acid.

15. The process which comprises reacting a 16-lower alkyl-11,21-bisoxygenated-Δ¹⁶-steroid of the pregnane series with a mixture of a strong percarboxylic acid and a strong carboxylic acid thereby forming the corresponding 16-lower alkylene-17α-hydroxy-steroid compound of the pregnane series.

16. The process which comprises reacting 9α-fluoro-16-methyl-11β,21-dihydroxy-1,4,16-pregnatriene-3,20-dione 21-acetate with a mixture of peroxytrifluoroacetic acid and trifluoroacetic acid thereby forming the corresponding 9α-fluoro-16-methylene-11β,17α,21-trihydroxy-1,4,16-pregnatriene-3,20-dione 21-acetate.

No references cited.